(12) United States Patent
Conrad et al.

(10) Patent No.: US 6,991,424 B2
(45) Date of Patent: Jan. 31, 2006

(54) GAS FRICTION PUMP

(75) Inventors: Armin Conrad, Herborn (DE); Jörg Stanzel, Wetzlar (DE)

(73) Assignee: Pfeiffer Vacuum GmbH, Asslar (DE)

( * ) Notice: Subject to any disclaimer, the term of this patent is extended or adjusted under 35 U.S.C. 154(b) by 86 days.

(21) Appl. No.: 10/773,467

(22) Filed: Feb. 5, 2004

(65) Prior Publication Data
US 2005/0169744 A1    Aug. 4, 2005

(30) Foreign Application Priority Data
Jan. 29, 2004    (EP)    .................. 04001873

(51) Int. Cl.
F04D 29/04    (2006.01)

(52) U.S. Cl. ...................... 415/104; 415/229

(58) Field of Classification Search .................. 415/90, 415/111, 112, 229, 104; 417/365, 423.4
See application file for complete search history.

(56) References Cited

U.S. PATENT DOCUMENTS

| 3,832,084 A | 8/1974 | Maurice |
| 3,969,042 A * | 7/1976 | Bachler .................. 417/354 |
| 6,368,082 B1 * | 4/2002 | Conrad et al. .......... 417/423.4 |

FOREIGN PATENT DOCUMENTS

| FR | 2602834 | 2/1988 |
| WO | 9920433 | 4/1999 |

OTHER PUBLICATIONS

Search Report.

* cited by examiner

Primary Examiner—Ninh H. Nguyen
(74) Attorney, Agent, or Firm—Abelman Frayne & Schwab

(57) ABSTRACT

A gas friction pump includes stationary (6) and rotatable (5) pump-active elements secured on a rotor shaft (4) and forming with the rotor shaft components of the rotor, with the rotor shaft (4) being supported by two, spaced from each other, radial bearings (8, 9), of which one is located closer to the gravity center of the rotor than the other, and an axial bearing (16), and with the radial bearing (9), which is located closer to the gravity center of the rotor, being formed as a gas bearing, and another radial bearing (8) being formed as a non-gas bearing.

3 Claims, 1 Drawing Sheet

GAS FRICTION PUMP

BACKGROUND OF THE INVENTION

1. Field of the Invention

The present invention relates to a gas friction pump including stationary pump-active elements and rotatable pump-active elements cooperating with the stationary pump-active elements. The rotatable pump-active elements are secured on a rotatable rotor shaft. The rotor shaft and the rotatable pump-active elements form components of the rotor. The rotor shaft is supported by two, spaced from each other, radial bearings of which one is located closer to the center of gravity of the rotor, and by an axial bearing.

2. Description of the Prior Art

Gas friction pumps, in particular, turbomolecular pumps are successfully used in many applications where a low end vacuum needs to be reached.

The term turbomolecular pump follows from the similarity with turbines, i.e., with blade rings being alternative supported on rotor and stator. The pumping effect is produced by cooperation of the rotor and the stator and increases with an increase of the rotational speed of the rotor. There exist different concepts for forming the rotor and for supporting it. In one of the variants, the pump-active structure of the rotor is mounted on an end of a shaft. The structure can be formed, e.g., of discs into which the blades can be inserted and which then are shrinked on a shaft. Thereby, a disc package is provided on the shaft end. Beneath this package, the shaft is supported at two locations and is provided with a motor. This often is arranged between the two support locations. This type of support is called a floating support as the gravity center lies outside the support locations.

In another variant, the rotor is formed as one piece of a solid material with an inner hollow cavity. The "bell" is then reverse drawn with respect to the support and the motor, and is screwed with a located therein shaft. With this construction, the gravity center of the rotor lies in vicinity of or in the upper shaft bearing.

In both constructions, in particular with a floating support, the forces acting in the upper bearing are high. Therefore, the located there bearing should have a high stiffness.

The simplest variant of a support is a ball bearing. Because of large forces and rotational speeds in the upper bearing, oil lubrication and cooling are indispensable. Despite this, the service life of a ball bearing is limited, and a replacement should take place in regular intervals.

Because of the construction of the pump, a ball bearing, which forms the bearing located adjacent to the gravity center, lies very deep inside the pump. Therefore, the oil supply is difficult and the replacement expensive.

A further problem is created by hydrocarbon vapors which are released from the oil of the bearing. Those are pumped out during the operation of the pump, but during stoppage of the pump they can reach the pumped-out recipient. This is highly undesirable during the manufacturing of semiconductors.

In the state of the art, it is known to replace the ball bearings in the upper support with magnetic bearings. In order to achieve a desired stiffniess, as a rule, an active magnetic radial bearing needs to be used. The technical expenses associated with such a bearing are high: further, electric magnets are necessary which provide for a variable positioning (controlled by current). In addition, position sensors are needed which determine a position of a rotor and communicate in form of an input signal to control electronics. It controls current with which the electromagnets are drive. With an increased stiffness of the bearing, the current also increases. This generates additional heat that has to be removed. In comparison with ball bearings, noticeably higher technical expenses lead to high manufacturing costs, which are result of an increased demand for better maintenance and bearing characteristics.

In some application, e.g., in the semiconductor industry, magnetically supported pumps became acceptable. If one accepts, as conventional bearings, bearings a large number of which, when produced, is defective and which are available for many years on the market, magnetic bearings should be counted among them.

A different path was proposed already in 1973 in a laid-open German application DE-OS 22 55 618. This publication teaches use of gas bearings in turbomolecular pumps, wherein all degrees of freedom (except those of rotation) are supported by gas bearings. A high stiffness is achieved with gas bearings only when the clearance between the shaft and the stator of the bearing is very small. With this feature of reducing the clearance, one reaches the limits very quickly, in particular when the precision at mounting of stator and rotor parts is concerned. E.g., when two radial bearings, which are spaced from each other by a certain distance, are used, a smallest deviation from centering in one of the bearings leads to unpermissible change of the most narrow clearance in the respective other bearing, and it is very difficult if almost impossible to effect the necessary high-precision adjustments. For solution of this problem it was proposed, e.g., to appropriately suspend the bearing unit in the pump housing, as disclosed in DE-OS 199 15 983. The foregoing suggestion up to the present did not found commercial application in gas-supported turbomolecular pumps.

An object of the invention is to provide a floating or a bell-shaped rotor having a maintenance-friendly construction and a bearing of which located close to the gravity center of the rotor and has a high stiffness. The construction should solve the problem of a high-precision centering.

SUMMARY OF THE INVENTION

The object of the invention is achieved by forming the radial bearing, which is located closer to the gravity center of the rotor, as a gas bearing.

In a gas friction pump with a bell-shaped or floating rotor, the bearing, which is located closer to the gravity center, is capable to better absorb high reaction forces when a gas bearing is used in this location. Gas bearings have a high stiffness and operate at necessary high rotation speeds. They are subjected only to a minimal wear, thereby increasing the maintenance intervals and, as a result, significantly reducing costs.

By using only one gas radial bearing, the need in a high-precision centering of the support points is eliminated. On the other hand, with a construction in which at least one of the bearings and/or the drive is/are formed as an independent module or two bearings are formed as independent module, the high-precision centering and, thereby, the use of other gas bearings become possible. For implementation of the invention, all types of gas bearings can be used, in particular aerodynamic and aerostatic bearings.

DETAILED DESCRIPTION OF THE PREFERRED EMBODIMENT

Figure 1:
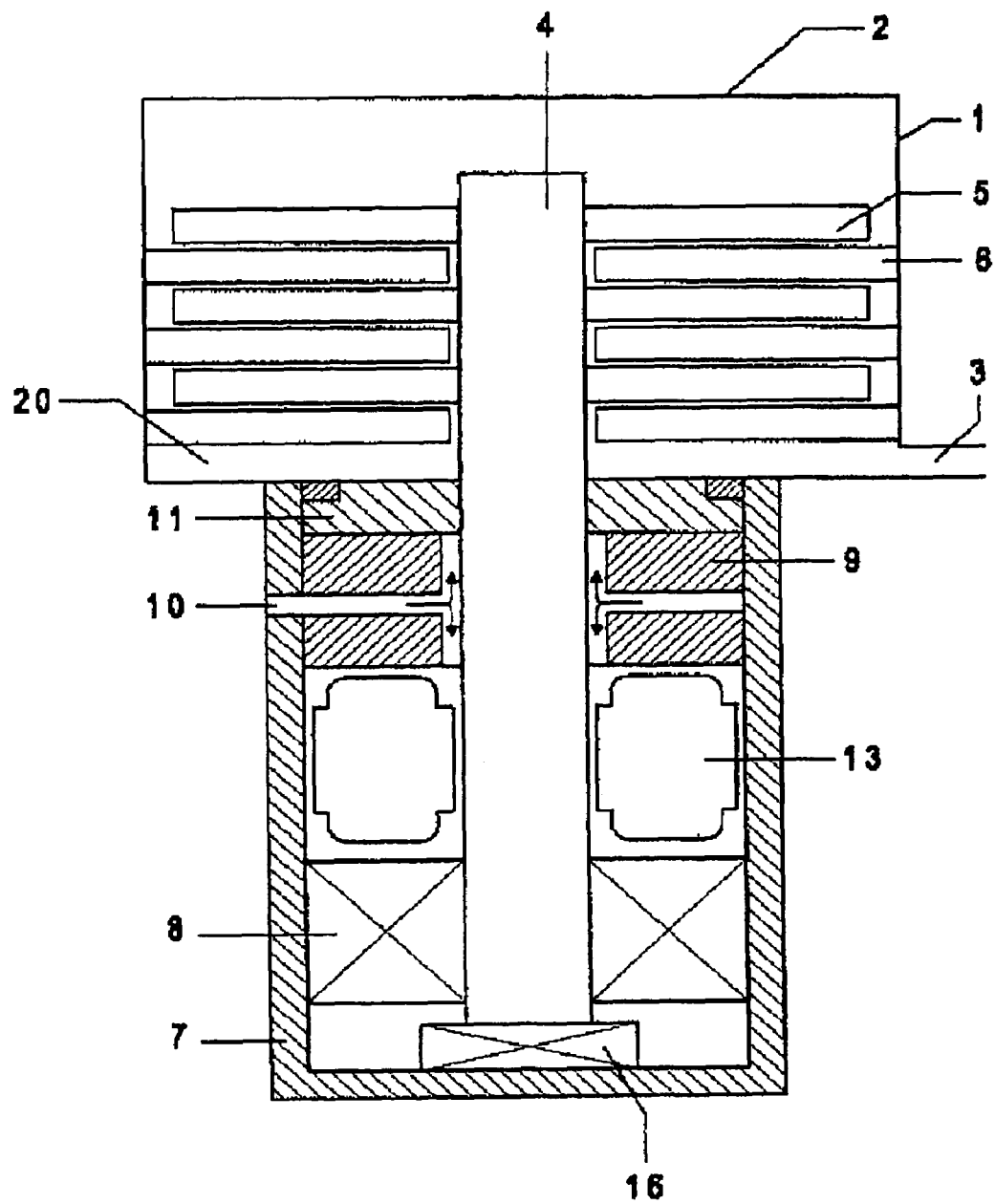
FIG. 1 shows a schematic view of gas friction pump according to the present invention.

Based on a single drawing, the present invention will be explained and further advantageous embodiments will be discussed. The drawing shows an embodiment of a turbomolecular pump with a floating rotor. In a pump housing 1 with a suction flange 2 and an outlet opening 3, there are mounted stationary pump-active components such as stator discs 6. Rotatable pump-active components are formed by rotor discs 5 fixedly mounted on a rotor shaft 4. A drive 13 provides for its rotation.

For supporting the rotor shaft, in a cylindrical housing part 7, adjacent to the drive, there are located lower bearing unit 8 and upper bearing unit 9. A bearing 16 supports the rotor shaft axially. In the shown embodiment, the axial bearing, which is located at the lower end of the rotor shaft, can be placed at another location, e.g., in vicinity of the upper radial bearing 9. Sealing means 11 is provided between the upper bearing unit and a gas outlet region 20. The upper bearing unit is formed as a gas bearing and is supplied with gas over a gas conduit 10. Of the two bearing units, the upper bearing unit is the closest to the gravity center of the rotor and should be able to absorb a greater bearing pressure. With a floating support, the dynamic forces, even with a bell-shaped rotor, and the load are here the greatest, in particular if the pump is not mounted vertically. Therefore, this bearing is formed as a gas bearing which has a high stiffness. Simultaneously, it is in principle very wear-resistant, so that maintenance costs, because of a rare replacement of the bearing, are noticeably reduced.

As a lower bearing, an oil-lubricated ball bearing or another similar bearing can be used, as the forces here are smaller. The replacement of the bearing at this location is less problematic and, therefore, is less expensive.

The operating gas, which flows out of the gas bearing, forms a gas film over which a supported object hovers. This gas should not reach the low pressure region and should be kept away with suitable sealing means 11 from the pump chamber and a gas outlet 20. The sealing means can be formed as a labyrinth seal or as gas draining means provided between the bearing 9 and the gas outlet 20.

In an advantageous embodiment, the upper bearing unit with the gas bearing is formed as module which here should be understood as a unit that contains all of the essential components of the bearing. This module is then inserted in a cylindrical section of the housing and is secured there. Thus, the gas bearing can be formed as a separate unit. The manufacturing of such a gas bearing with small clearances and laser-drilled holes is error-prone. When a produced bearing module does not correspond to the necessary standards, it is simply not used. Without the use of a modular construction, a noticeably large part of the pump is affected and cannot be used anymore. With a modular construction, the production costs can be reduced.

Developing this principle further, one can obtain a further advantageous embodiment of the invention. In this embodiment, both bearing units 8, 9 and the drive 13 can be formed as a module. This module is produced separately. Then, it is inserted into the cylindrical housing part and is secured there. Thereby, a very good alignment of separate bearing elements is obtained and the production costs are reduced further. Moreover, the pump becomes even more maintenance-friendly. Furthermore, it is possible to provide a pump complete with axial and radial gas bearings, however, the principle is not limited to this. Also passive or active magnet bearings as well as ball bearings can be formed as separate modules and be combined with remaining modules. It is also possible to combine separate bearing components and the motor and to integrate them in a module so that the pump is assembled in a single operating step.

What is claimed is:

1. A gas friction pump, comprising stationary (6) and rotatable (5), secured on a rotatable rotor shaft (4), pump-active elements, wherein the rotor shaft (4) and the rotatable pump-active elements (5) form components of the rotor, and the rotor shaft (4) is supported by two, spaced from each other, radial bearings (8, 9), of which one is located closer to a gravity center of the rotor than the other, and an axial bearing (16), and wherein the radial bearing (9), which is located closer to the gravity center of the rotor, is formed as a gas bearing, and another radial bearing (8) is formed as a non-gas bearing.

2. A gas friction pump according to claim 1, wherein the another bearing (9) is a ball bearing.

3. A gas friction pump according to claim 1, wherein sealing means (1) is provided between the gas bearing and a gas outlet region (20).

\* \* \* \* \*